United States Patent [19]
Wrigley

[11] 3,937,188
[45] Feb. 10, 1976

[54] TWO-CYCLE JET IGNITION ENGINE WITH PRECHAMBER IN PISTON

[75] Inventor: Clifford C. Wrigley, Grosse Pointe Woods, Mich.

[73] Assignee: General Motors Corporation, Detroit, Mich.

[22] Filed: Jan. 13, 1975

[21] Appl. No.: 540,672

[52] U.S. Cl. ............. 123/32 SP; 123/32 B; 123/67; 123/191 SP
[51] Int. Cl.$^2$.. F02B 19/10; F02B 19/18; F02B 3/00
[58] Field of Search..... 123/32 ST, 32 SP, 67, 32 B, 123/191 SP

[56] References Cited
UNITED STATES PATENTS
2,156,665   5/1939   Mallory ........................... 123/32 SP
FOREIGN PATENTS OR APPLICATIONS
816,140   6/1937   France ............................. 123/32 SP Primary Examiner—Charles J. Myhre
Assistant Examiner—Ronald B. Cox
Attorney, Agent, or Firm—Robert J. Outland

[57] ABSTRACT

A two-cycle spark ignition engine is provided with jet ignition means including a prechamber formed within the piston and connected by a restricted passage with the main combustion chamber. At piston bottom dead center, the prechamber connects with an auxiliary inlet from which it receives a rich air-fuel mixture. At piston top dead center, the prechamber communicates with a spark plug that initiates combustion in the rich mixture, causing a flame jet to shoot through the restricted passage to the main combustion chamber, igniting and burning the lean mixture therein. A lean air-fuel mixture may be provided in the main chamber by any of several means, including direct or manifold injection, carburetion or carry-over from the rich mixture in the prechamber. Both uniflow scavenged and loop scavenged arrangements are disclosed.

7 Claims, 3 Drawing Figures

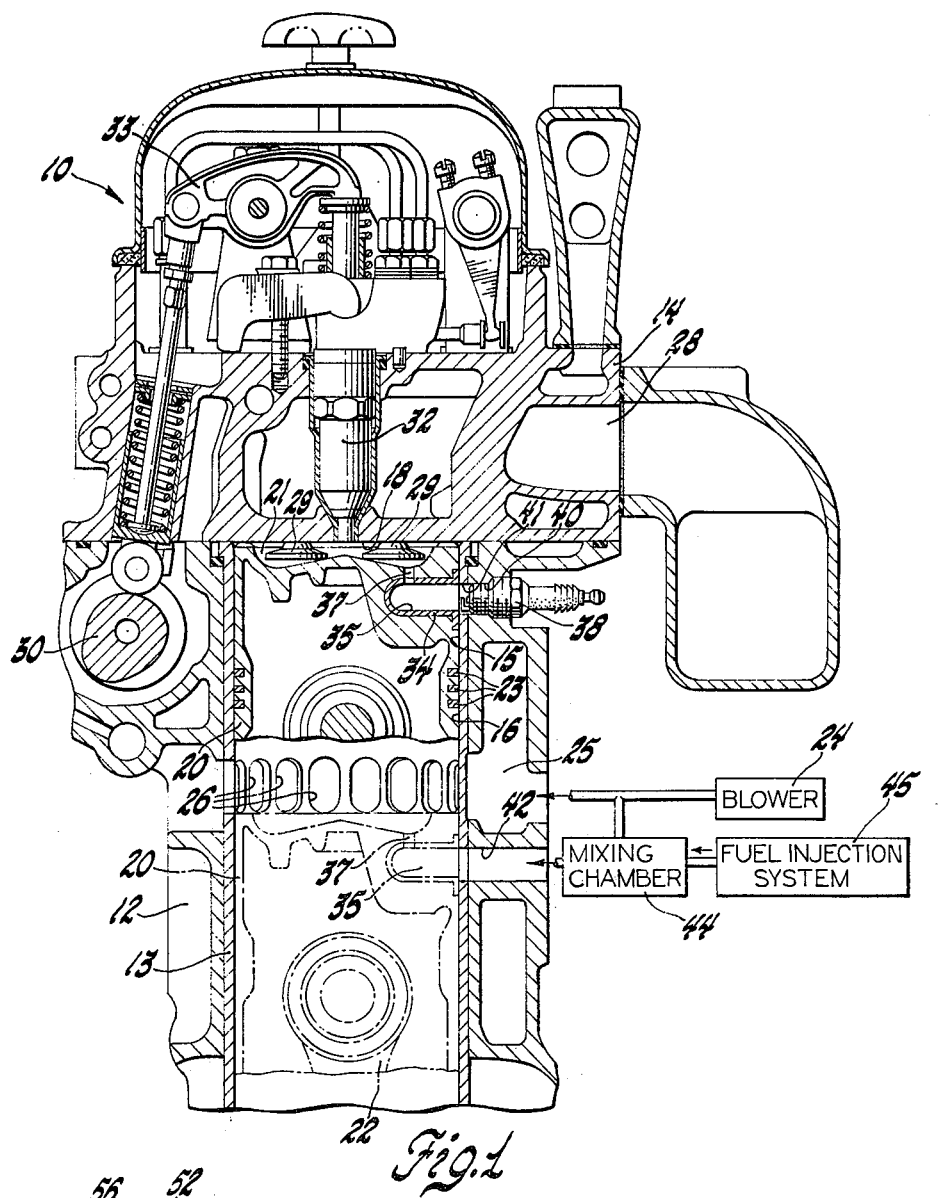
Fig. 1
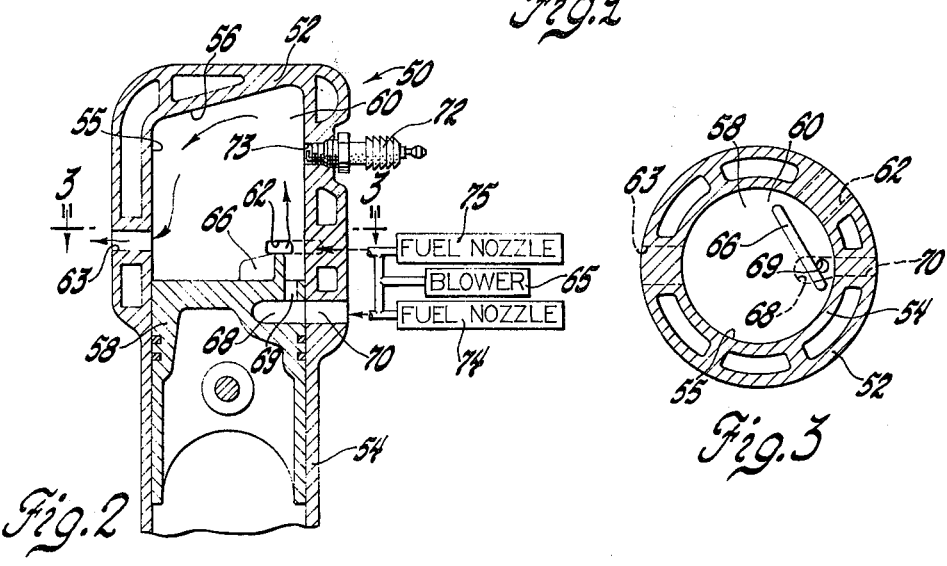
Fig. 2
Fig. 3

TWO-CYCLE JET IGNITION ENGINE WITH PRECHAMBER IN PISTON

FIELD OF THE INVENTION

This invention relates to internal combustion engines and more particularly to engines of the two-stroke, spark ignition type provided with prechamber jet ignition means.

BACKGROUND OF THE INVENTION

It is well known in the art to provide a four-stroke cycle internal combustion engine with a main combustion chamber in which air or a lean air-fuel mixture is provided and an auxiliary combustion chamber or prechamber connected with the main chamber by a restricted passage or orifice and in which a preferably rich air-fuel mixture is provided for ignition by a spark plug. In such engines the combustion originating in the prechamber forces into the main chamber a jet of burning gases, including unburned and partially burned mixture and combustion products. The burning jet, because of its high energy, is able to ignite a lean mixture in the main chamber, thereby permitting the burning of overall leaner mixtures in an engine than would be possible without the jet ignition process. Two examples of engines utilizing some of the many variations of the above-described principle are shown in U.S. Pat. Nos. 1,568,638 and 1,833,445 Summers.

In the main, the prechamber jet ignition principale has been applied to four-cycle spark ignition engines, and principle is thought there would be advantages in providing simple arrangements applicable to two-cycle engines in which inlet air or air-fuel mixture is admitted through piston controlled ports, rather than the poppet valves generally utilized in four-cycle engines.

SUMMARY OF THE INVENTION

The present invention provides two-cycle engine arrangements which incorporate prechamber jet ignition means in which the prechamber means are formed within the engine piston or pistons. The arrangements provide for the admission of air or lean air-fuel mixture through piston controlled inlet ports, as is common in two-cycle engines, an auxiliary port feeds rich air-fuel mixture to the prechamber when the piston is at bottom dead center. Upon upward movement of the piston to top dead center, the prechamber communicates with a spark plug fixedly mounted in the engine cylinder which ignites the rich mixture in the prechamber, initiating combustion and causing a flame jet to shoot through a restricted passage into the main chamber so as to ignite the lean mixture therein.

The placement of the prechamber permits both the main chamber and the prechamber to be scavenged at the time fresh mixture is admitted without requiring the use of poppet inlet valves or other such devices as is conventional in jet ignition prechamber type engines. The invention is adaptable to various scavenging arrangements including both uniflow and loop scavenging.

The foregoing, as well as numerous other features and advantages, will be more fully understood from the following description of certain preferred embodiments taken together with the accompanying drawing.

BRIEF DESCRIPTION OF THE DRAWING

In the drawing:

FIG. 1 is a fragmentary cross sectional view of an internal combustion engine of the two-cycle uniflow scavenged type formed according to the invention;

FIG. 2 is a fragmentary cross sectional view showing an alternative embodiment of engine of the two-cycle loop scavenged type formed according to the invention; and FIG. 3 is a cross sectional view of one cylinder of the engine of FIG. 2 taken generally in the plane indicated by the line 3—3 of FIG. 2.

DESCRIPTION OF THE ILLUSTRATED EMBODIMENTS

Referring first to FIG. 1 of the drawing, there is shown an internal combustion engine of the two-stroke cycle, uniflow scavenged type generally indicated by the numeral 10. Engine 10 includes a cylinder block 12 retaining a plurality of cylinder liners 13, only one being shown. The cylinder liners have their upper ends closed by a cylinder head 14. The head is mounted on the upper end of the block and cooperates therewith and with the liners 13 to form a plurality of closed end cylinders 15, each having a cylindrical side wall 16 and a planar end wall 18.

Within each cylinder there is reciprocably disposed a piston 20 which cooperates with the closed end cylinder to define a variable volume combustion chamber 21 adjacent the end wall 18 of the cylinder. Piston 20 is movable from a top dead center position shown in full lines in the drawing, in which position the combustion chamber has its minimum volume, to a bottom dead center position shown in phantom lines in the drawing, in which position the combustion chamber has its maximum volume. The piston connects by means of a connecting rod 22 with a crankshaft, not shown, to which power is delivered in operation of the engine in conventional manner. The piston is provided with a plurality of compression rings 23 and oil control rings, not shown, which are mounted on the piston and engage the cylinder walls in conventional manner.

The engine is provided with a suitable engine or exhaust driven air blower or the like, shown here schematically by block 24, and arranged to feed charging air in known fashion to an enclosed air box 25 formed within the engine cylinder block surrounding the cylinder liners. The air box connects with a plurality of peripheral inlet ports 26 in each cylinder liner which are controlled in known manner by movement of the piston, being open when the piston is in its bottom dead center position to permit charging air to pass from the air box into the combustion chamber 21, which is then at its largest volume.

The cylinder head 14 is provided with a plurality of exhaust ports 28 which open through the end wall 18 of each cylinder and are controlled by poppet exhaust valves 29 actuated through suitable valve gear driven by the engine camshaft 30 in known manner. The valve timing is arranged so that the valves are open when the respective piston is near its bottom dead center position, permitting exhaust gases to escape and the combustion chamber to be scavenged by fresh air admitted through the inlet ports 26.

The cylinder head also mounts a fuel injector 32 for each cylinder which is actuated by suitable valve gear 33 driven by the camshaft 30. The fuel injector may be timed to admit a charge of fuel to the combustion chamber during the compression stroke to mix with the inlet air and form a lean air-fuel mixture in the chamber.

Within each piston 20 there is provided a small recess containing a thin wall insert 34 that defines a prechamber 35, which may also be known as an ignition chamber or auxiliary combustion chamber. Prechamber 35 is located just below the top of the piston and is connected by a restricted passage or orifice 37 with the main combustion chamber 21. The prechamber is open through the side of the piston to the side wall of the cylinder liner in which the piston reciprocates.

As shown in the drawing, when the piston is in its top dead center position (shown in full lines), the prechamber communicates with a spark plug 38, which is mounted in a threaded opening 40 in the cylinder block that communicates with the prechamber through an opening 41 in the cylinder liner.

In the bottom dead center position of the piston (shown in phantom lines), the prechamber 35 connects with an auxiliary inlet port 42 extending through the cylinder block and liner. Port 42 is in turn connected, as shown schematically in the drawing, with a mixing chamber or passage 44 that receives pressurized air from the blower 24 and is connected to receive fuel from a fuel injection system 45 or alternative form of fuel supply means adapted to provide fuel to mix with the air so as to supply a rich air-fuel mixture to the prechamber 35 when the piston is in its bottom center position.

In operation, as each piston moves downwardly to its bottom dead center position, the exhaust valves 29 are opened, permitting the escape of exhaust gases, while the piston opens the inlet ports 26, permitting fresh air to enter and scavenge the combustion chamber. At the same time, prechamber 35 is aligned with the auxiliary inlet port 42 and receives an air-fuel mixture therefrom which scavenges and fills the prechamber. If desired, an excess flow of rich mixture may be provided for, some of which will flow through the restricted orifice 37 and enter the combustion chamber 21.

As the piston moves upwardly, the exhaust valves and inlet ports are closed, trapping the air charge in the cylinder. At this point the open end of the prechamber is also closed by the cylinder side wall so that the rich mixture is trapped and compressed in the prechamber as the piston moves upwardly on the compression stroke. During this period an appropriate charge of fuel may be injected by the injector 32 into the main chamber to form an air-fuel mixture in the combustion chamber which will generally be leaner than stoichiometric but may be varied in order to control the load on the engine. If desired, the air charge may be throttled by means not shown and the air-fuel mixture may be made consistently lean for normal operation and enriched only for full power operation.

When the piston reaches its top dead center position, the mixtures in both the main chamber and the prechamber are fully compressed, and the open end of the prechamber is located opposite the spark plug 38. At or slightly in advance of this position, the spark plug is fired, igniting and burning the mixture in the prechamber. Combustion causes expansion of the prechamber gases and burning products, forcing a flaming jet of actively burning products through the restricted orifice 37 and into the combustion chamber 21 where the flaming jet ignites the lean air-fuel mixture in the main chamber. The burning and expansion of the gases in the main chamber then forces the piston down and the cycle is repeated.

It should be understood that while the engine arrangement shown utilizes fuel injection for providing air-fuel mixture in the main and auxiliary chambers, it would be equally possible to provide the desired air-fuel mixtures by other known means, such as carburetion or the like. It should also be noted that the portion of the cylinder liner that is longitudinally aligned with the piston prechamber has no inlet ports 26 so that the auxiliary chamber is not connected with the air box when it passes the ported zone of the cylinder liner.

FIGS. 2 and 3 show an alternative embodiment of engine of the loop scavenged type incorporating the features of the present invention and generally indicated by numeral 50. Engine 50 includes a cylinder block 52 defining a closed end cylinder 54 having side and end walls 55, 56, respectively. Within the cylinder 54, a piston 58 is reciprocably disposed for movement between upper and lower dead center positions.

The piston and cylinder define a combustion chamber 60 which varies in volume between a minimum at the upper dead center position of the piston and a maximum at the lower dead center position of the piston. The cylinder block is provided with inlet and exhaust ports 62, 63, respectively, which are controlled by the piston and communicate with the combustion chamber when the piston is in its bottom dead center position. A blower 65 provides pressurized air to the inlet port for charging and scavenging the combustion chamber and forcing the exhaust gases out the exhaust port. A vane 66 on the top of the piston directs the flow of the fresh charge upwardly through the cylinder to scavenge out the previously burned gases and prevent loss of the fresh charge through the exhaust port.

Piston 58 is provided with an internal prechamber 68 which is connected by a restricted passage 69 through the top of the piston with the combustion chamber 60. Prechamber 68 is also open on one side to the side wall 55 of the cylinder in which the piston reciprocates. At the bottom dead center of the piston, prechamber 68 communicates with an auxiliary intake port 70 provided in the cylinder wall, whereas at the piston top center position, the prechamber 68 communicates with a spark plug 72 provided in an opening 73 in the wall of the cylinder.

The auxiliary intake port 70 is also connected to be fed by the blower 65. Separate fuel nozzles 74, 75 are provided for feeding fuel into the auxiliary and main intake ports 70, 62, respectively, so that the desired air-fuel mixtures may be supplied to the prechamber and main combustion chamber.

The operation of the engine of FIGS. 2 and 3 is essentially the same as that for the engine of FIG. 1, except that the engine operates as a loop scavenged engine without the presence of poppet valves or valve gear.

As in the first embodiment, it would be possible to vary the manner in which the fuel is admitted to the main combustion chamber and the prechamber in any fashion consistent with the present invention. In view of these and other changes which may be made in the form of this invention by those skilled in the art without departing from its teachings, it is intended that the invention be limited only by the language of the following claims.

What is claimed is:

1. A two-cycle internal combustion engine including means defining a closed end cylinder, a piston reciprocably movable in said cylinder and defining therewith a combustion chamber adjacent said cylinder closed end and variable in volume from a minimum to a maximum upon movement of said piston from top dead center to bottom dead center positions, respectively, a prechamber formed within said piston and connected to said combustion chamber by a restricted passage through the end of said piston, said prechamber being open on one side through a cylinder engaging wall of said piston, exhaust means through said cylinder and open to said combustion chamber near its maximum volume to permit removal of exhaust products from said chamber, first inlet means through said cylinder and open to said combustion chamber near its maximum volume to admit a fresh gas charge directly to said combustion chamber, second inlet means through said cylinder and positioned such that upon movement of said piston to its bottom dead center position, said prechamber communicates through its open side with said second inlet means for supplying a rich charge of air-fuel mixture to said prechamber, and ignition means mounted in said cylinder and positioned such that upon movement of said piston to its top dead center position, said prechamber communicates with said ignition means, for ignition of said prechamber charge, combustion of which causes expulsion of burning gases through said restricted passage to said combustion chamber and consequent ignition and burning of the gas charge in said combustion chamber.

2. A two-cycle internal combustion engine including means defining a cylinder having side and end walls, a piston reciprocably movable between top and bottom dead center positions in said cylinder and defining therewith a combustion chamber adjacent said end wall and variable in volume from a minimum to a maximum upon movement of said piston, respectively, from its top to its bottom dead center positions, an exhaust port through a wall of said cylinder and open to said combustion chamber near its maximum volume to permit the escape of exhaust products from said combustion chamber, a main inlet port through said cylinder and open to said combustion chamber near its maximum volume to admit a fresh gas charge directly to said combustion chamber, a prechamber in said piston and connected with said combustion chamber by a restricted passage through the end of said piston, said prechamber being open on one side to said cylinder side wall, an auxiliary inlet port through said cylinder side wall and positioned to communicate with the open side of said prechamber in the piston bottom dead center position for supplying a rich charge of air-fuel mixture to said prechamber, and ignition means in said cylinder side wall and positioned to be adjacent the open side of said prechamber in the piston top dead center position for ignition of said prechamber charge, combustion of which causes expulsion of burning gases through said restricted passage to said combustion chamber for ignition and burning of the gas charge therein.

3. An engine in accordance with claim 2 wherein said inlet ports and said exhaust port are in said cylinder side wall and are controlled by movement of said piston.

4. An engine in accordance with claim 2 wherein said exhaust port is valve controlled and disposed in said cylinder end wall and said inlet ports are piston controlled and disposed in said cylinder side wall.

5. An engine according to claim 2 and further including means operable to supply air to said main inlet port and a rich air-fuel mixture to said auxiliary inlet port.

6. An engine according to claim 5 and further including means operable to supply fuel to form a lean air-fuel mixture with the air supplied to said main inlet port.

7. An engine according to claim 5 and further including means operable to supply fuel to said combustion chamber to form a lean air-fuel mixture therein with the air supplied through said main inlet port.

* * * * *